(12) United States Patent     (10) Patent No.: US 7,778,190 B2
Wan et al.     (45) Date of Patent: Aug. 17, 2010

(54) CORRELATING LABEL SWITCHED PATHS OF A PSEUDOWIRE

(75) Inventors: Calvin Wan, Plano, TX (US); Ronald P Folkes, Dallas, TX (US); Nimer I. Yaseen, Allen, TX (US); Chenjiang Hu, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 11/863,374

(22) Filed: Sep. 28, 2007

(65) Prior Publication Data

US 2009/0086621 A1     Apr. 2, 2009

(51) Int. Cl.
*H04L 12/26* (2006.01)
*H04L 12/56* (2006.01)

(52) U.S. Cl. ................ 370/244; 370/392; 370/400

(58) Field of Classification Search ......... 370/389, 370/244, 392, 400
See application file for complete search history.

(56) References Cited

U.S. PATENT DOCUMENTS

| 2005/0220107 A1* | 10/2005 | DelRegno et al. ........... 370/392 |
| 2008/0095061 A1* | 4/2008 | Hua et al. ........... 370/248 |
| 2008/0151905 A1* | 6/2008 | Krzanowski ........... 370/395.5 |
| 2008/0247324 A1* | 10/2008 | Nadeau et al. ........... 370/245 |

OTHER PUBLICATIONS

Andersson, L., et al., "*LDP Specification*", Network Working Group, Request for Comments: 3036, Category: Standards Track, http://www.faqs.org/rfcs/rfc3036.html, 132 pages, Jan. 2001.

Awduche, D., "*RSVP-TE: Extensions to RSVP for LSP Tunnels*", Network Working Group, Request for Comments: 3209, Category: Standards Track, http://www.faqs.org/rfcs/rfc3209.html, 61 pages, Dec. 2001.

Martini, L., et al., "*Pseudowire Setup and Maintenance Using the Label Distribution Protocol (LDP)*", Network Working Group, Request for Comments: 4447, Category: Standards Track, http://www.ietf.org/rfc/rfc4447.txt, 31 pages, Apr. 2006.

Aggarwal, R., et al., "*RFD for MPLS LSPs*", draft-ietf-bfd-mpls-04.txt, Network Working Group, Internet Draft, Expiration Date: Sep. 2007, http://tools.ietf.org/html/draft-ietf-bfd-mpls-04, 12 pages, Mar. 2007.

* cited by examiner

*Primary Examiner*—Alpus H Hsu
*Assistant Examiner*—Saad Hassan
(74) *Attorney, Agent, or Firm*—Baker Botts L.L.P.

(57) ABSTRACT

In one embodiment, correlating label switched paths of a pseudowire includes receiving a first message at a second label switching router. The first message is sent from a first label switching router and includes a pseudowire identifier and a first label switched path identifier. The pseudowire identifier identifies a pseudowire, and the first label switched path identifier identifies a first label switched path that implements the pseudowire. A second message is sent from the second label switching router to the first label switching router. The second message comprises the pseudowire identifier and a second label switched path identifier. The second label switched path identifier identifies a second label switched path that implements the pseudowire.

18 Claims, 2 Drawing Sheets

CORRELATING LABEL SWITCHED PATHS OF A PSEUDOWIRE

TECHNICAL FIELD

This invention relates generally to the field of communication networks and more specifically to correlating label switched paths of a pseudowire.

BACKGROUND

A pseudowire (PW) is an emulation of a native service over a Packet Switched Network (PSN). The pseudowire emulates the operation of a transparent wire that carries the native service, and may be used to carry packets from a network that uses the native service, across a Packet Switched Network, to another network that uses the native service.

SUMMARY OF THE DISCLOSURE

In accordance with the present invention, disadvantages and problems associated with previous techniques for using pseudowires may be reduced or eliminated.

According to one embodiment of the present invention, correlating label switched paths of a pseudowire includes receiving a first message at a second label switching router. The first message is sent from a first label switching router and includes a pseudowire identifier and a first label switched path identifier. The pseudowire identifier identifies a pseudowire, and the first label switched path identifier identifies a first label switched path that implements the pseudowire. A second message is sent from the second label switching router to the first label switching router. The second message comprises the pseudowire identifier and a second label switched path identifier. The second label switched path identifier identifies a second label switched path that implements the pseudowire.

Certain embodiments of the invention may provide one or more technical advantages. A technical advantage of one embodiment may be that a message includes a pseudowire-to-label switched path (PW-to-LSP) mapping that maps a pseudowire to paths that implement the pseudowire. The message is sent to nodes of the pseudowire to the inform the nodes of the paths that implement the pseudowire. If one node detects a fault on one path, the node may use the other path to send a failure notification to the other node.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
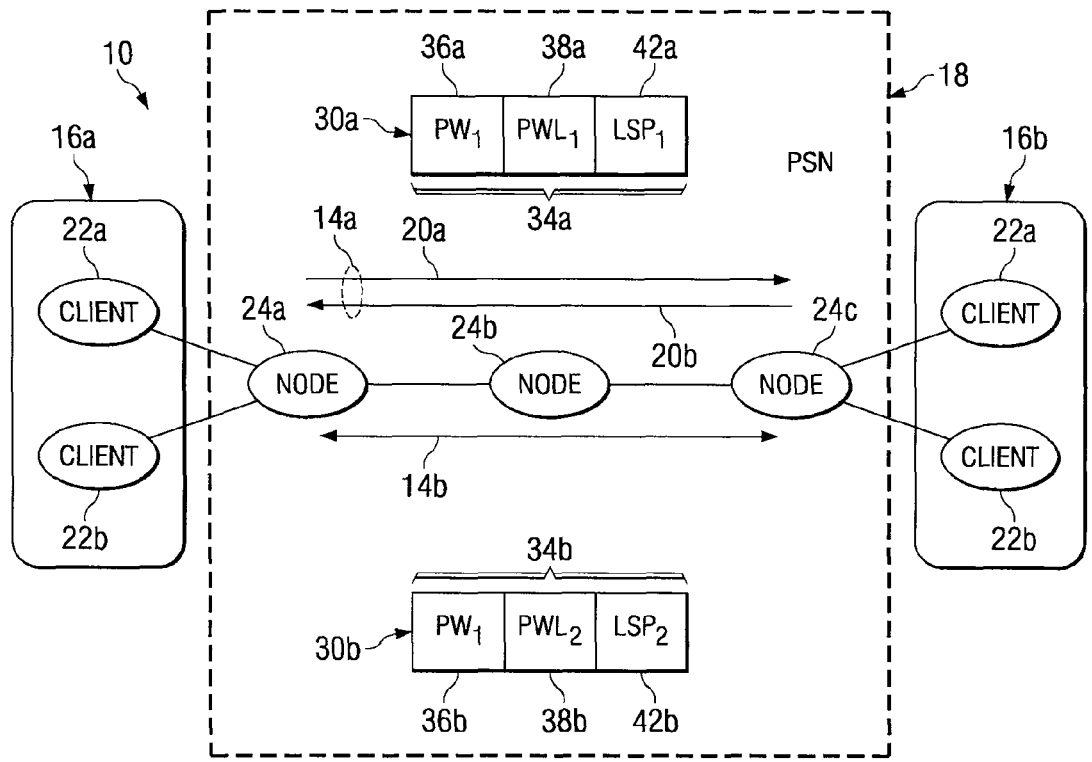
FIG. 1 illustrates an example of a system for correlating label switched paths of a pseudowire.
Figure 2:
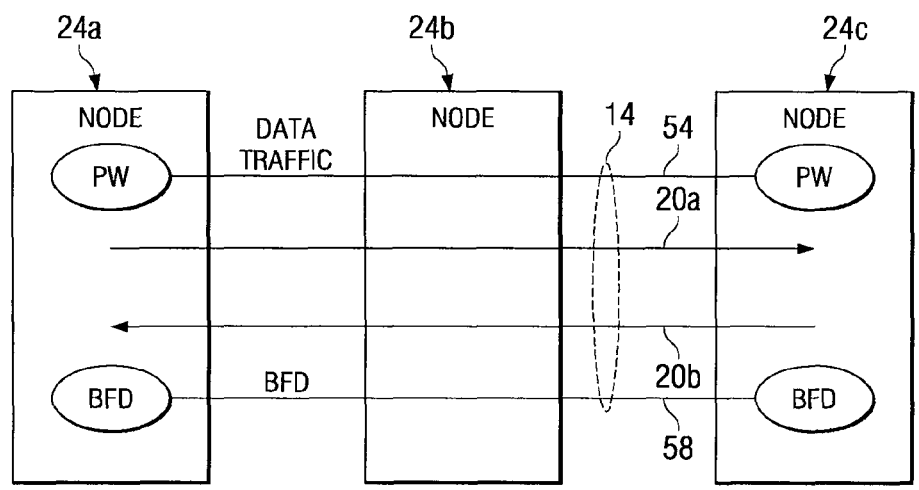
FIG. 2 illustrates an example of a pseudowire implemented by paths of the system of FIG. 1.
Figure 3:
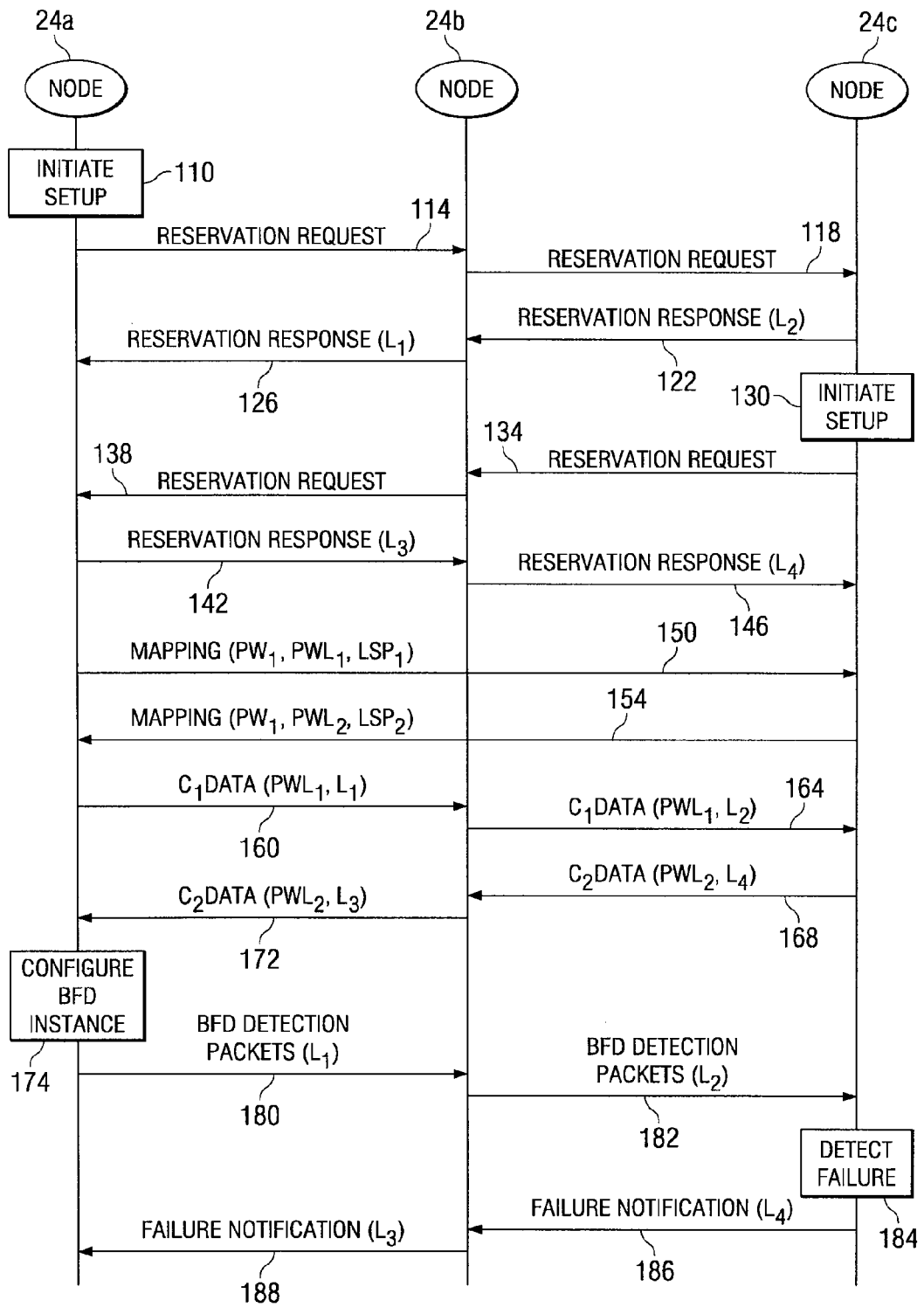
FIG. 3 illustrates an example of a method for correlating label switched paths of a pseudowire.

Embodiments of the present invention and its advantages are best understood by referring to FIGS. 1 through 3 of the drawings, like numerals being used for like and corresponding parts of the various drawings.

FIG. 1 illustrates a system 10 for correlating label switched paths of a pseudowire. In the embodiment, a pseudowire 14 that includes nodes 24 is implemented by paths 20, such as label switched paths. A message 30 includes a pseudowire-to-label switched path (PW-to-LSP) mapping that maps pseudowire 14 to paths 20. Message 30 is sent to nodes 24 to inform nodes 24 of paths 20 that implement pseudowire 14. A node 24 may use a path 20 to send a notification, such as a failure notification, to another node 24.

In one embodiment, system 10 communicates information through signals such as optical signals (for example, Synchronous Transport Signals (STSs)). As an example, an optical signal may have a data rate of 10, 20, 40, or over 40 gigabits per second. Information may include voice, data, audio, video, multimedia, control, signaling, and/or other information.

In the illustrated embodiment, system 10 includes Layer 1 or Layer 2 (Layer 1/2) networks 16 (networks 16a and 16b) and a packet switched network (PSN) 18. Layer 1/2 network 16 uses a native service that implements Layer 1/2 protocols, such as Asynchronous Transfer Mode (ATM), Frame Relay, Ethernet, Time-Division Multiplexing (TDM), synchronous optical networking/synchronous digital hierarchy (SONET/SDH), and/or other suitable Layer 1/2 protocols. Layer 1/2 networks 16a and 16b include clients 22a and 22c. A client 22 communicates using Layer 1/2 protocols.

Packet switched network (PSN) 18 implements Layer 3 or higher protocols such as MultiProtocol Label Switching (MPLS), Internet Protocol (IP), or Layer 2 Tunneling Protocol (L2TP). Packet switched network 18 includes nodes 24a, 24b, and 24c. Node 24 represents any suitable network element such as a Multi-Protocol Label Switching (MPLS) MPLS router, or label switching router.

A path 20, or circuit or tunnel, comprises a sequence of nodes 24 that communicate packets. Path 20 may be a label switched path (LSP). Packets travel from an ingress node 24a, through zero, one, or more intermediate nodes 24b, to an egress node 24c. In the illustrated example, path 20a goes from ingress node 24a through intermediate node 24b to egress node 24c. Path 20b goes from ingress node 24c through intermediate node 24b to egress node 24a. A path identifier identifies path 20. In the illustrated example, path identifier $LSP_1$ identifies path 20a, and path identifier $LSP_2$ identifies path 20b. A node 24 may manage the pseudowire parameters, such as the pseudowire identifiers and labels, as well as the source, destination, and path identifiers.

To route a packet along path 20a, ingress node 24a attaches a label to a packet and sends the packet to a next hop node according to a forwarding entry for path 20a. Intermediate node 24b uses the label from node 24a to look up another forwarding entry. Intermediate node 24b replaces the label from node 24a with a new label and sends the packet to a next hop node according to the forwarding entry. Egress node 24c uses the label from node 24b to look up a forwarding entry. The forwarding entry indicates that node 24c is the egress node.

Pseudowire 14 is implemented by paths 20a and 20b. Pseudowire 14 emulates Layer 1/2 services over packet switched network 18, and allows for Layer 1/2 packets to be communicated over packet switched network 18. Pseudowire acts like a Layer 1/2 wire and may be used to forward Layer 1/2 packets from one Layer 1/2 network 16a to another Layer 1/2 network 16b over packet switched network 18.

A particular pseudowire 14 may be used to communicate packets to particular clients. For example, pseudowire 14a communicates between clients 22a, and pseudowire 14b communicates between clients 22b.

A pseudowire identifier identifies a particular pseudowire 14. For example, pseudowire identifier $PW_1$ identifies pseudowire 14a, and pseudowire identifier $PW_2$ identifies pseudowire 14b. Pseudowire labels are allocated to a particular pseudowire 14 during setup of the pseudowire 14. In one embodiment, one label $PWL_1$ may be given to a pseudowire $PW_1$ in one direction, and another label $PWL_2$ may be given to the same pseudowire $PW_1$ in the other direction.

Message 30 communicates information about pseudowire 14 to nodes 24 of path 20. In the illustrated embodiment, message 30 includes a pseudowire-to-label switched path (PW-to-LSP) mapping 34. PW-to-LSP mapping 34 indicates paths 20 that implement pseudowire 14. PW-to-LSP mapping 34 includes a pseudowire identifier 36, a pseudowire label 38, and a label switched path identifier 42.

In the illustrated embodiment, node 24a sends message 30a to node 24c, and node 24c sends message 30b to node 24a. PW-to-LSP mapping 34a informs node 24c of path 20a that implements pseudowire 14a, and PW-to-LSP mapping 34b informs node 24a of path 20b that implements pseudowire 14a.

Specifically, pseudowire identifier 36a includes pseudowire identifier $PW_1$ identifying pseudowire 14a, pseudowire label 38a includes label $PWL_1$ identifying pseudowire 14a in one direction, and label switched path identifier 42a includes path identifier $LSP_1$ identifying path 20a. Pseudowire identifier 36b includes pseudowire identifier $PW_1$ identifying pseudowire 14a, pseudowire label 38b includes label $PWL_2$ identifying pseudowire 14a in the other direction, and label switched path identifier 42b includes path identifier $LSP_2$ identifying path 20b.

Message 30 represents any suitable message, for example, a Label Distribution Protocol (LDP) a label mapping message used to set up a pseudowire 14 or an LDP notification message used to update pseudowire 14. PW-to-LSP mapping 34 may be communicated in any suitable portion of message 30, for example, a type-length-value (TLV) element.

PW-to-LSP mapping 34 allows ingress and egress nodes 24a and 24c to know paths 20 used to form pseudowires 14. Accordingly, in the event that a path 20a of a pseudowire 14 fails, egress node 24c can notify ingress node 24a using the other path 20b. Using the other path 20b may be more efficient since path 20b does not require IP forwarding.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic, and may be embodied as a computer-readable storage medium. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of network system 10 may be integrated or separated according to particular needs. Moreover, the operations of network system 10 may be performed by more, fewer, or other devices. Additionally, operations of network system 10 may be performed using any suitable logic. As used in this document, "each" refers to each member of a set or each member of a subset of a set.

FIG. 2 illustrates an example of pseudowire 14 implemented by paths 20a and 20b of system 10 of FIG. 1. Pseudowire 14 communicates data traffic 54 and bidirectional forwarding detection (BFD) control packets 58. Bidirectional forwarding detection detects a data plane failure in the forward path of a label switched path 20. To detect a data plane failure of path 20a, ingress node 24a sends one or more failure detection packets to egress node 24c over path 20a. The failure detection packets may be BFD control packets that are sent at a configurable rate.

If egress node 24c does not receive the packets in an expected manner, path 20a is declared to be faulty. An unexpected manner indicating failure may occur if, for example, the packets do not have the expected contents, a particular number of packets fails to arrive, and/or the packets are late. Egress node 24c sends a failure notification on path 20b indicating that there is a failure of path 20a.

FIG. 3 illustrates one embodiment of a method for correlating label switched paths of a pseudowire. According to one embodiment, the method may be performed by system 10.

Steps 110 through 126 describes setup of path 20a according to, for example, Resource Reservation Protocol (RSVP). Node 24a initiates setup of path 20a from node 24a to node 24c at step 110. Node 24a determines that path 20a includes node 24a, node 20b, and node 24c. A BFD instance is allocated. Node 24a sends a reservation request to node 24b at step 114. Node 24b processes the reservation request, and forwards the reservation request to node 24c at step 118.

Node 24c selects label $L_2$ for the link from node 24c to node 24b, and sends the label $L_2$ to node 24b in a reservation response at step 122. Node 24b selects a label $L_1$ for the link from node 24b to node 24a, and sends the label $L_1$ to node 24a in a reservation response at step 126.

Steps 130 through 146 describe setup of path 20b from node 24c to node 24a. Node 24c initiates setup of path 20b from node 24c to node 24a at step 130. Node 24c determines that path 20b includes node 24c, node 20b, and node 24a. A BFD instance is allocated. Node 24c sends a reservation request to node 24b at step 134. Node 24b processes the reservation request, and forwards the reservation request to node 24a at step 138.

Node 24a selects label $L_3$ for the link from node 24a to node 24b, and sends the label $L_3$ to node 24b in a reservation response at step 142. Node 24b selects a label $L_4$ for the link from node 24b to node 24c, and sends the label $L_4$ to node 24c in a reservation response at step 146.

Steps 150 and 154 describe setup of pseudowire $PW_1$ according to, for example, LDP. The setup involves notification of nodes 24a and 24c of paths $LSP_1$ and $LSP_2$ that implement pseudowire $PW_1$. The notification may also be performed during an update process. Node 24a sends PW-to-LSP mapping 34a to node 24c at step 150. Node 24a selects path $LSP_1$ for pseudowire $PW_1$. In the illustrated embodiment, PW-to-LSP mapping 34a includes pseudowire identifier $PW_1$, pseudowire label $PWL_1$, and LSP identifier $LSP_1$.

Node 24c sends PW-to-LSP mapping 34b to node 24a at step 154. Node 24c selects path $LSP_2$ for pseudowire $PW_1$. PW-to-LSP mapping 34b includes pseudowire identifier $PW_1$, pseudowire label $PWL_2$, and LSP identifier $LSP_2$.

Steps 160 through 172 describe communication of data between nodes 24a and 24c. Node 24a sends data packets designated for clients $C_1$ to node 24b at step 160. The data packets include pseudowire label $PWL_1$ and label $L_1$. Node 24b sends data packets to node 24c at step 164. The data packets include pseudowire label $PWL_1$ and label $L_2$. Node 24c removes the labels and forwards the packets to client $C_1$. Node 24c sends data packets to node 24b at step 168, and node 24b sends the data packets to node 24a at step 172.

Steps 174 through 188 describe performance of bidirectional forwarding detection. The BFD instance is configured at step 174 with transmit and receive labels that allow the BFD detection packets and failure notifications to travel over paths 20a and 20b.

Node 24a sends one or more BFD detection packets to node 24c along path 20a at steps 180 and 182. Node 24c detects a failure at step 184. Node 24c sends a BFD failure notification along path 20b at steps 186 and 188. The failure notification indicates that a failure of path 20a has been detected.

Certain embodiments of the invention may provide one or more technical advantages. A technical advantage of one embodiment may be that a message includes a pseudowire-to-label switched path (PW-to-LSP) mapping that maps a pseudowire to paths that implement the pseudowire. The message is sent to nodes of the pseudowire to the inform the node of the paths that implement the pseudowire. A node may use a path to send a notification, such as a failure notification, to another node.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for correlating a plurality of label switched paths of a pseudowire, comprising:
    receiving a first message at a second label switching router, the first message sent from a first label switching router, the first message comprising a pseudowire identifier and a first label switched path identifier, the pseudowire identifier identifying a pseudowire, the first label switched path identifier identifying a first label switched path that implements the pseudowire;
    sending a second message from the second label switching router to the first label switching router, the second message comprising the pseudowire identifier and a second label switched path identifier, the second label switched path identifier identifying a second label switched path that implements the pseudowire;
    mapping the first and second label switched path identifiers to the pseudowire identifier for failure notification;
    at the second label switching router, expecting one or more failure detection packets from the first label switching router, the one or more failure detection packets sent from the first label switching router along the first label switched path based on the mapping; and
    detecting a failure of the first label switched path in accordance with the expectation.

2. The method of claim 1, wherein:
    the first message comprises a first label mapping message; and
    the second message comprises a second label mapping message.

3. The method of claim 1, wherein:
    the first message comprises a first label updating message.

4. The method of claim 1, further comprising:
    detecting, by the second label switching router, a failure of the first label switched path using bi-directional forwarding detection.

5. The method of claim 1, further comprising:
    detecting a failure of the first label switched path; and
    sending a notification of the failure from the second label switching router to the first label switching router along the second label switched path.

6. The method of claim 1, the pseudowire operable to communicate data traffic and detection control traffic between the first label switching router and the second label switching router.

7. A system for correlating a plurality of label switched paths of a pseudowire, comprising:
    an interface of a second label switching router, the interface operable to:
        receive a first message sent from a first label switching router, the first message comprising a pseudowire identifier and a first label switched path identifier, the pseudowire identifier identifying a pseudowire, the first label switched path identifier identifying a first label switched path that implements the pseudowire; and
    one or more processors operable to:
        generate a second message comprising the pseudowire identifier and a second label switched path identifier, the second label switched path identifier identifying a second label switched path that implements the pseudowire;
    the interface further operable to:
        send the second message to the first label switching router;
    the one or more processor further operable to:
        map the first and second label switched path identifiers to the pseudowire identifier for failure notification;
        expect one or more failure detection packets from the first label switching router, the one or more failure detection packets sent from the first label switching router along the first label switched path based on the mapping; and
        detect a failure of the first label switched path in accordance with the expectation.

8. The system of claim 7, wherein:
    the first message comprises a first label mapping message; and
    the second message comprises a second label mapping message.

9. The system of claim 7, wherein:
    the first message comprises a first label updating message.

10. The system of claim 7, the one or more processors further operable to:
    detect a failure of the first label switched path using bi-directional forwarding detection.

11. The system of claim 7, the one or more processors further operable to:
    detect a failure of the first label switched path; and
    send a notification of the failure to the first label switching router along the second label switched path.

12. The system of claim 7, the pseudowire operable to communicate data traffic and detection control traffic between the first label switching router and the second label switching router.

13. A computer readable storage medium embodied with computer instructions for correlating a plurality of label switched paths of a pseudowire, the computer instructions embodied in a computer-readable storage medium and operable to:

receive a first message at a second label switching router, the first message sent from a first label switching router, the first message comprising a pseudowire identifier and a first label switched path identifier, the pseudowire identifier identifying a pseudowire, the first label switched path identifier identifying a first label switched path that implements the pseudowire;

send a second message from the second label switching router to the first label switching router, the second message comprising the pseudowire identifier and a second label switched path identifier, the second label switched path identifier identifying a second label switched path that implements the pseudowire;

map the first and second label switched path identifiers to the pseudowire identifier for failure notification;

at the second label switching router, expect one or more failure detection packets from the first label switching router, the one or more failure detection packets sent from the first label switching router along the first label switched path based on the mapping; and detect a failure of the first label switched path in accordance with the expectation.

14. A computer readable storage medium embodied with computer instructions of claim 13, wherein:

the first message comprises a first label mapping message; and the second message comprises a second label mapping message.

15. A computer readable storage medium embodied with computer instructions of claim 13, wherein:

the first message comprises a first label updating message.

16. A computer readable storage medium embodied with computer instructions of claim 13, further comprising:

detecting a failure of the first label switched path; and sending a notification of the failure from the second label switching router to the first label switching router along the second label switched path.

17. A computer readable storage medium embodied with computer instructions of claim 13, the pseudowire operable to communicate data traffic and detection control traffic between the first label switching router and the second label switching router.

18. A system for correlating a plurality of label switched paths of a pseudowire, comprising:

means for receiving a first message at a second label switching router, the first message sent from a first label switching router, the first message comprising a pseudowire identifier and a first label switched path identifier, the pseudowire identifier identifying a pseudowire, the first label switched path identifier identifying a first label switched path that implements the pseudowire;

means for sending a second message from the second label switching router to the first label switching router, the second message comprising the pseudowire identifier and a second label switched path identifier, the second label switched path identifier identifying a second label switched path that implements the pseudowire;

means for mapping the first and second label switched path identifiers to the pseudowire identifier for failure notification;

means for expecting one or more failure detection packets from the first label switching router at the second label switching router, the one or more failure detection packets sent from the first label switching router along the first label switched path based on the mapping; and means for detecting a failure of the first label switched path in accordance with the expectation.

* * * * *